United States Patent
Liu et al.

(10) Patent No.: US 11,309,931 B2
(45) Date of Patent: Apr. 19, 2022

(54) METHOD FOR PERFORMANCE ADJUSTMENT, APPARATUS, AND ELECTRONIC DEVICE

(71) Applicant: ZTE Corporation, Shenzhen (CN)

(72) Inventors: Fengpeng Liu, Shenzhen (CN); Dongmei Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/960,512

(22) PCT Filed: Aug. 21, 2018

(86) PCT No.: PCT/CN2018/101551
§ 371 (c)(1),
(2) Date: Jul. 7, 2020

(87) PCT Pub. No.: WO2019/179016
PCT Pub. Date: Sep. 26, 2019

(65) Prior Publication Data
US 2020/0412402 A1    Dec. 31, 2020

(30) Foreign Application Priority Data
Mar. 23, 2018 (CN) .......................... 201810246719.1

(51) Int. Cl.
*H04B 1/401* (2015.01)
*H04B 17/18* (2015.01)
(Continued)

(52) U.S. Cl.
CPC ........... *H04B 1/401* (2013.01); *H04B 1/3833* (2013.01); *H04B 17/18* (2015.01); *H04B 17/26* (2015.01);
(Continued)

(58) Field of Classification Search
CPC ........ H04B 1/401; H04B 17/18; H04B 17/26; H04B 17/29; H04B 1/3833; H04W 24/08; H04W 88/005
See application file for complete search history.

(56) References Cited

U.S. PATENT DOCUMENTS 8,799,455 B1 * 8/2014 Vora ...................... G06F 16/958
709/224
9,872,078 B2 * 1/2018 Goergen ............ H04N 21/4882
(Continued)

FOREIGN PATENT DOCUMENTS

| CN | 101366293 A | 2/2009 |
| CN | 102907137 A | 1/2013 |

(Continued)

OTHER PUBLICATIONS

CN, Extended Search report and Office Action dated Feb. 2, 2021, CN Application No. 201810246719.1.
(Continued)

*Primary Examiner* — Dominic E Rego
(74) *Attorney, Agent, or Firm* — Vivacqua Crane PLLC

(57) ABSTRACT

A method for performance adjustment, an apparatus, a terminal, a storage medium, and an electronic device, the method includes: performing statistics on first usage information of a first terminal, to obtain usage preference information corresponding to the first usage information; adjusting the communication performance of the first terminal based on the usage preference information.

9 Claims, 7 Drawing Sheets

(51) Int. Cl.
*H04B 17/26* (2015.01)
*H04B 17/29* (2015.01)
*H04B 1/3827* (2015.01)
*H04W 24/08* (2009.01)
*H04W 88/00* (2009.01)

(52) U.S. Cl.
CPC ............ *H04B 17/29* (2015.01); *H04W 24/08* (2013.01); *H04W 88/005* (2013.01)

(56) References Cited

U.S. PATENT DOCUMENTS

| | | | | |
|---|---|---|---|---|
| 2002/0120540 | A1* | 8/2002 | Kende | G06Q 30/0275 705/35 |
| 2004/0203759 | A1* | 10/2004 | Shaw | H04W 8/18 455/433 |
| 2005/0177538 | A1* | 8/2005 | Shimizu | H04N 21/4821 |
| 2008/0137635 | A1* | 6/2008 | Pan | H04L 1/0625 370/345 |
| 2009/0213870 | A1* | 8/2009 | Terasawa | H04L 12/417 370/442 |
| 2012/0254442 | A1* | 10/2012 | Uemura | G06F 9/5011 709/226 |
| 2013/0061127 | A1* | 3/2013 | Reyes | G06Q 30/02 715/234 |
| 2014/0130182 | A1* | 5/2014 | Yackanich | G06Q 30/0269 726/27 |
| 2014/0273882 | A1 | 9/2014 | Asrani et al. | |
| 2015/0095418 | A1* | 4/2015 | Davis | G06F 40/253 709/204 |
| 2016/0012702 | A1* | 1/2016 | Hart | G08B 25/001 340/584 |
| 2016/0037195 | A1* | 2/2016 | Shin | H04N 21/44222 725/14 |
| 2016/0285883 | A1* | 9/2016 | Sawa | G05B 19/18 |
| 2017/0185276 | A1* | 6/2017 | Lee | G06F 3/04883 |
| 2017/0185581 | A1* | 6/2017 | Bojja | G06K 9/6269 |
| 2017/0188298 | A1 | 6/2017 | Pattan et al. | |
| 2017/0366282 | A1* | 12/2017 | Aoki | H04B 17/15 |
| 2018/0167118 | A1* | 6/2018 | Kakishima | H04W 72/04 |
| 2018/0219591 | A1* | 8/2018 | Murakami | H04B 7/04 |
| 2020/0107338 | A1* | 4/2020 | Egner | H04W 72/1215 |

FOREIGN PATENT DOCUMENTS

| | | |
|---|---|---|
| CN | 105467932 A | 4/2016 |
| CN | 106790817 A | 5/2017 |
| CN | 106973408 A | 7/2017 |
| EP | 2139125 A1 | 12/2009 |

OTHER PUBLICATIONS

International Search Report and Written Opinion for International Application No. PCT/CN2018/101551, dated Dec. 5, 2018.

* cited by examiner

| | Intelligent tunable scheme | Optimization of antenna standing wave |
|---|---|---|
| B40 intermediate frequency band right hand | switching scheme  |  |
| B3 high frequency band right hand | capacitance/inductance adjustment  |  |

| | Antenna selection or Antenna area selection | Implementation scheme |
|---|---|---|
| B40 intermediate frequency band right hand | 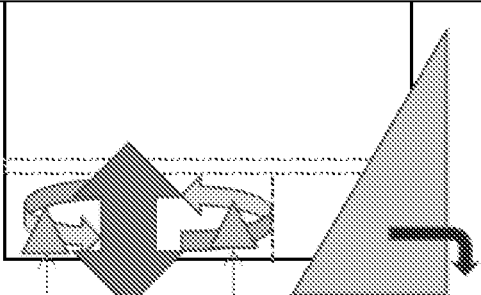 using the feedback point of cell 1# / using the feedback point of cell 2# / not using the feedback point of cell 3# | scheme of feed points switching combination 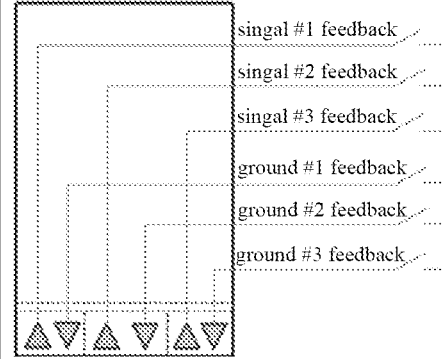 singal #1 feedback / singal #2 feedback / singal #3 feedback / ground #1 feedback / ground #2 feedback / ground #3 feedback |
| B3 high frequency band right hand | 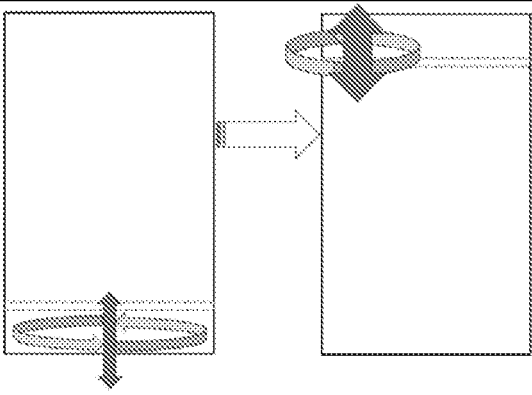 | path swithing scheme 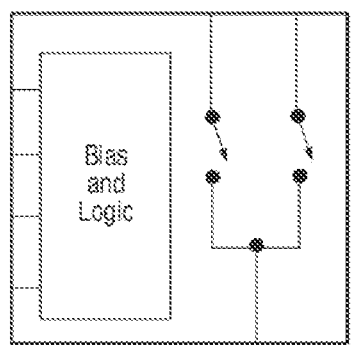 |

FIG. 11

METHOD FOR PERFORMANCE ADJUSTMENT, APPARATUS, AND ELECTRONIC DEVICE

CROSS-REFERENCE TO RELATED APPLICATION

This application is a national stage filing under 35 U.S.C. § 371 of International Patent Application Serial No. PCT/CN2018/101551, filed Aug. 21, 2018, which claims priority to Chinese patent application No. 201810246719.1 filed Mar. 23, 2018. The contents of these applications are incorporated herein by reference in their entirety.

TECHNICAL FIELD

The present disclosure relates to, but are not limited to, the field of communications technologies, and more particularly relates to performance adjustment method, apparatus, and electronic device.

BACKGROUND

The communication performance of a general terminal equipment is constant. However, the communication performance of the terminal is affected by the surrounding environment, which may include various factors such as terminal usage scenario (handheld, antenna being touched), relative position of the user and the base station, frequency band, network standard and so on. In fact, there are various sensors for detecting the surrounding environmental information and global positioning system (GPS) installed in an existing terminal (such as a mobile phone). In addition, an underlying layer of software can also record the identity of the resident base station (ID), network, and signal strength. However, such kinds of information are simply monitored in real time and are not associated with the use of the terminal antenna. According to the related technology, a low-insertion-loss antenna switch is proposed and widely used, and so as to antenna switching technology. However, the switching criterion applied in antenna switching technology is limited to the switching of different frequency bands in a specific scenario. Even switching between different standard in the same frequency band has not been applied. For these reasons, terminal communication performance has always been a problem in the art.

In the related technology, each terminal faces a problem that the communication performance deteriorates due to different actual scenarios, for example, a random medium is close to or touches an antenna, thereby affecting the communication performance. The terminal mainly adopts a one-time design scheme, which is generally an evasion scheme. The common scheme is: no matter what scenario for each terminal, the antenna is away from the critical appearance side. The disadvantage of this scheme is that the terminal is thick and heavy, and cannot use popular materials such as ceramic metal, but only traditional materials such as plastic. The current schemes of related technologies have drastically decreased the signal quality in different scenarios.

SUMMARY

The embodiments of the present disclosure provide performance adjustment method and apparatus, terminal, non-transitory computer-readable storage medium, and electronic device.

According to an embodiment of the present disclosure, a method for performance adjustments is provided, which includes: performing statistics on first usage information of a first terminal, to obtain usage preference information corresponding to the first usage information; adjusting the communication performance of the first terminal based on the usage preference information.

According to an embodiment of the present disclosure, an apparatus for performance adjustments is provided, which includes: a statistical module, configured to perform statistics on first usage information of a first terminal, to obtain usage preference information corresponding to the first usage information; and a first adjustment module, configured to adjust communication performance of the first terminal based on the usage preference information.

According to another embodiment of the present disclosure, a terminal including the above apparatus is also provided.

According to another embodiment of the present disclosure, a non-transitory computer-readable storage medium having a computer program stored therein is provided, wherein the computer program is configured to, when being executed, perform the steps in any of the methods described above.

According to another embodiment of the present disclosure, there is provided an electronic device including a memory in which a computer program is stored and a processor configured to execute the computer program to perform the steps in any of the methods described above.

According to the present disclosure, the usage preference information of the terminal is obtained by performing statistics on the first use information of the terminal. The communication performance of the terminal is adjusted based on the use preference information. By continuously performing statistics on the first use information of the terminal, the communication performance of the terminal can be continuously adjusted based on the obtained use preference information. As a result, the terminal can continuously learn and optimize, wherein the communication performance of the terminal can be continuously adjusted and optimized based on the acquired use preference information. Therefore, as a problem of the related technology, deterioration of communication performance caused by a fixed and dedicated design of the terminal, can be solved, and thus the communication performance can be improved and the user communication experience can be enhanced.

BRIEF DESCRIPTION OF DRAWINGS

The drawings described herein are used to provide a further understanding of the present disclosure and form a part of the present disclosure. The schematic embodiments and descriptions of the present disclosure are used to explain the present disclosure and not to limit the present disclosure. In the drawings:

FIG. 11 is a schematic diagram of a scheme of antenna switching according to an embodiment of the present disclosure.

DETAILED DESCRIPTION

The present disclosure will be described in detail below with reference to the accompanying drawings in conjunction with embodiments. It should be noted that, in the present disclosure, the embodiments and features of the embodiments may be combined with each other if there is no conflict.

It should be noted that the terms "first", "second" and the like in the description and claims of this disclosure and in the accompanying drawings are used for distinguishing between similar elements, and not necessarily for describing a particular sequential or chronological order.

Figure 1:
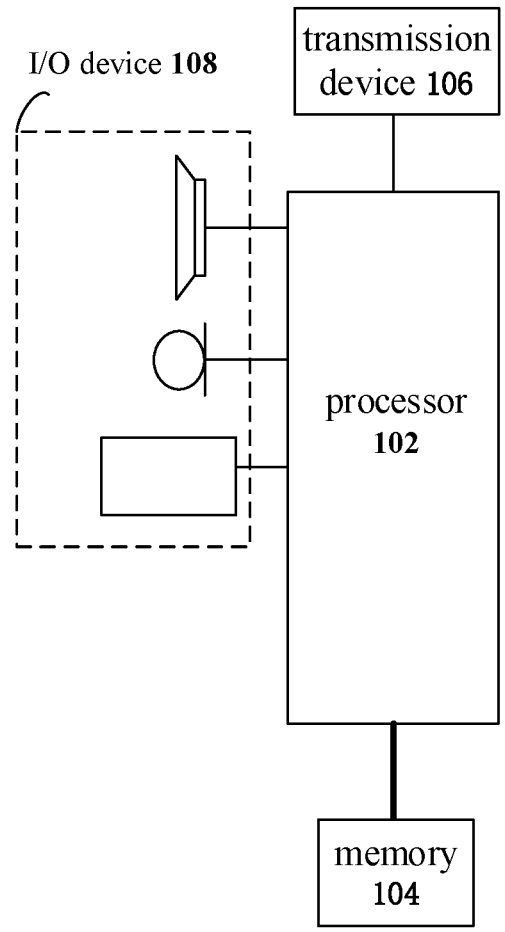
FIG. 1 is a hardware structural diagram of a mobile first terminal on which a performance adjustment method runs, according to an embodiment of the present disclosure.

The method provided by the embodiments of the present disclosure can be executed in a mobile first terminal, a computer first terminal or a similar operation device. For example, FIG. 1 is a hardware structural diagram of a mobile first terminal on which a performance adjustment method runs, according to an embodiment of the present disclosure. As shown in FIG. 1, the mobile first terminal may include one or more (only one is shown in FIG. 1) processor(s) 102 (the processor 102 may include but not limited to a processing device, such as a microprocessor MCU or a programmable logic device FPGA, etc.), and a memory 104 for storing data. Optionally, the above mobile first terminal can further include a transmission device 106 for communication functions and an I/O device 108. It will be understood by those skilled in the art that the structure shown in FIG. 1 is only an illustration and is not intended to limit the structure of the mobile first terminal. For example, the mobile first terminal may include more or less components than those illustrated in FIG. 1, or different arrangements of components shown in FIG. 1.

A memory 104 may be used to store computer programs, for example, software program and module of an application software, such as a computer program corresponding to the performance adjustment method according to the embodiment of the present disclosure. A processor 102 executes various functional applications and data processing by running the computer program stored in the memory 104, that is, implementing the above method. The memory 104 may include a high-speed random access memory, and may also include a non-volatile memory, such as one or more magnetic storage devices, flash memory, or other non-volatile solid-state memory. In some embodiments, the memory 104 may further include memories remotely located from the processor 102, which may be connected to the mobile first terminal over a network. Examples of the above network include but are not limited to the Internet, intranet for enterprise, local area network, mobile communication network, and combinations thereof.

The transmission device 106 is used to receive or send data via the network. A specific example of the network described above may include a wireless network provided by a communication provider of the mobile first terminal. In an embodiment, the transmission device 106 includes a network interface controller (NIC), which can be connected to other network devices through the base station to communicate with the Internet. In an embodiment, the transmission device 106 may be a radio frequency (RF) module, which is used to communicate with the Internet in a wireless manner.

Figure 2:
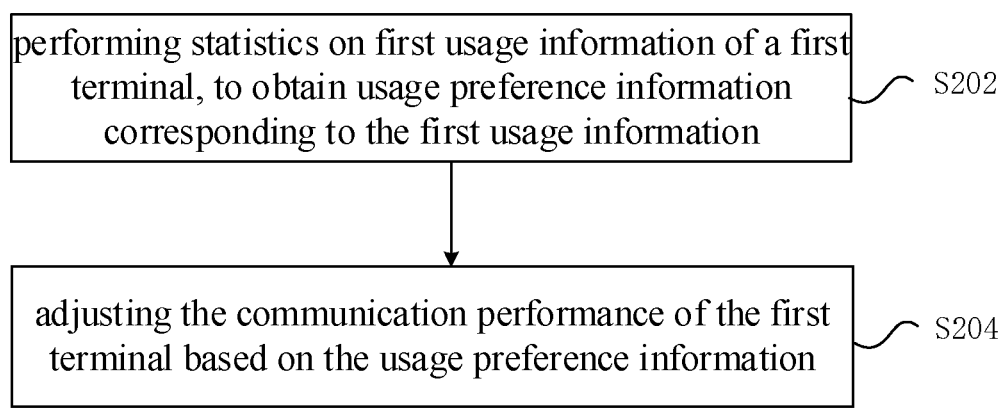
FIG. 2 is a flowchart of a performance adjustment method according to an embodiment of the present disclosure.

In this embodiment, a performance adjustment method running on the above mobile terminal is provided. FIG. 2 is a flowchart of a performance adjustment method according to an embodiment of the present disclosure. As shown in FIG. 2, the method includes the following step:

Step S202: performing statistics on first usage information of a first terminal, to obtain usage preference information corresponding to the first usage information;

Step S204: adjusting communication performance of the first terminal, based on the usage preference information.

On the basis of the above steps, the usage preference information of the terminal is obtained by performing statistics on the first use information of the terminal. The communication performance of the terminal is adjusted based on the use preference information. By continuously performing statistics on the first use information of the terminal, the communication performance of the terminal can be continuously adjusted based on the obtained use preference information. As a result, the terminal can continuously learn and optimize, wherein the communication performance of the terminal can be continuously adjusted and optimized based on the acquired use preference information. Therefore, as a problem of the related technology, deterioration of communication performance caused by a fixed and dedicated design of the terminal, can be solved, and thus the communication performance can be improved and the user communication experience can be enhanced.

It should be noted that the above first usage information may include at least one of the following: information of an operator selected and used by the first terminal, communication address information of the first terminal, information of service used by the first terminal, the usage gesture information of the first terminal, information of base station service used by the first terminal.

It should be noted that the above operator information may be China Mobile, China Unicom, China Telecom, etc., but it is not limited to these. The above communication address information may be information of countries such as China, the United States, and Europe, and is not limited to these. The above communication address may be also the building, the street, the province, the town, the city where the first terminal is located, and a specific location of the room in the building, but it is not limited to these. The above service information may include, but is not limited to, data service and voice service. The usage gesture information may be a placement manner of the first terminal, or a gesture in which a user holds the first terminal, for example, the user holds the first terminal only with a right hand, or only with a left hand, but it is not limited to these. The base station service information may include, but is not limited to:

frequency band information corresponding to the service information, information of a base station serving the above first terminal, cell frequency point(s) in the frequency band corresponding to the base station, power feedback or bit error rate feedback information of the base station.

It should be noted that the above usage preference information may include: first preference score information corresponding to the first usage information, wherein the first preference score information is used to indicate the number of times the first usage information is used. A higher score of the first preference score information indicate a greater number of times the first usage information is used corresponding to the score.

In the following description, taking the first usage information being the operator information as an example, the operator information may include China Unicom, China Mobile, and China Telecom. It's assumed that China Unicom is used more times than the others, China Mobile is used less times, and China Telecom is used least times. Therefore, a user of the above first terminal prefers to use China Unicom, followed by China mobile, and at last China Telecom. Thus, the score of the first preference score information for China Unicom is highest, followed by China Mobile, and at last China Telecom.

According to an embodiment of the present disclosure, the step S204 may be represented as: determining control information based on the usage preference information; and adjusting the communication performance of the first terminal based on the determined control information.

It should be noted that the communication performance may be embodied as radio frequency performance of the first terminal, such as, with respect to an antenna or an antenna standing wave used by the first terminal, but is not limited to these, and therefore, the adjustment of the communication performance of the first terminal based on the control information may be embodied as: adjusting an antenna standing wave of the first terminal and/or selecting an antenna for the first terminal based on the control information.

For example, when the user prefers to use an intermediate frequency band B40 for China Mobile, and tends to hold the first terminal with the right hand, the available control information may be information for controlling the on/off of the switch for adjusting the standing wave of the antenna. Alternatively, when the user prefers to use a high frequency band B3 for China Unicom, and tends to hold the first terminal with the right hand, the available control information may be information whether to use a capacitive circuit or an inductive circuit to adjust the standing wave of the antenna. For example again, when the user prefers to use an intermediate frequency band B40 for China Mobile, and tends to hold the first terminal with the right hand, the above control information may be information for controlling the on/off of the switch for adjusting the standing wave of the antenna, and the switching on and off can be ensured to select an antenna region with optimum communication performance for the first terminal; when the user prefers to use a high frequency band B3 for China Unicom, and tends to hold the first terminal with the right hand, the above control information may be information for controlling the on/off of the switch for adjusting the standing wave of the antenna, and the switching on and off can be ensured to select another antenna (i.e. switching an antenna) with optimum communication performance for the first terminal.

According to an embodiment of the present disclosure, after adjusting the communication performance of the first terminal based on the control information, the method may further include: obtaining a second usage information of the first terminal; outputting the control information in response to the second usage information being consistent with the first usage information; adjusting the communication performance of the first terminal based on the control information.

It should be noted, after obtaining a second usage information of the first terminal, the method may further include: in response to the second usage information being inconsistent with the first usage information, adding the second usage information into the first usage information, and assigning a second preference score information to the second usage information, wherein the second preference score information indicates a number of times the second usage information is used; the higher score of the second preference score information, the greater number of times the second usage information is used, corresponding to the score.

It should be noted, the above second usage information may be a first usage information of the first terminal at a current moment of usage; the second usage information being consistent with the first usage information, may be represented as: the above second usage information is included in the above first usage information; the above second usage information being inconsistent with the above first usage information, may be represented as: the above second usage information is not included in the above first usage information. Taking the above first usage information being the operator information as an example, when the first usage information is China Mobile and China Unicom, if the above second usage information is China Mobile or China Unicom, i.e. at a current moment, if the first terminal is using China Mobile or China Unicom, the second usage information may be considered as being consistent with the first usage information, thus a control information is directly output (at the current moment, the first terminal only focus on China Mobile and China Unicom, RF performance on other operators can be compromised); if the first terminal is using China Telecom at the current moment, the second usage information is inconsistent with the first usage information, it's thus needed to add the information "China Telecom" to the above first usage information, and assign a corresponding preference score to "China Telecom" for a subsequent usage.

Through the above steps, the first usage information of the first terminal can be continuously updated, that is, the statistical results of the first usage information of the first terminal can be continuously improved, and the communication performance can be continuously adjusted to improve the user's experiences to communication performance.

According to an embodiment of the present disclosure, determining control information based on the usage preference information includes: determining the control information, in response to the first terminal being not using communication service, based on a current locating information of the first terminal, and/or based on an usage preference information comprising a first preference score information with a highest score corresponding to various types of first usage information; and/or determining the control information, in response to the first terminal being using communication service, based on an usage preference information comprising a first preference score information with a highest score corresponding to various types of first usage information.

It should be noted that the locating information may be, but not limited to, at the current time, the location where the first terminal is currently located, information of the base station where the terminal is currently located, etc.

It should be noted, but it is not limited to, if the first terminal is not using the communication service, the first terminal may be considered to be in an idle state (waiting); if the first terminal is using the communication service, the first terminal may be considered to be in operation.

It should be noted, determining the control information, in response to the first terminal being not using communication service, based on the locating information of the first terminal, and the above usage preference information comprising a first preference score information with a highest score corresponding to various types of first usage information, may be represented as: determining the control information, in response to a successful localization, based on an usage preference information in which a first preference score information having a highest score corresponding to various types of first usage information in conformity with the locating information; determining the control information, in response to a failed localization, directly based on an usage preference information in which a first preference score information having a highest score corresponding to various types of first usage information. It should be noted, a successful localization may be represented as: successfully obtaining the locating information.

It should be noted, the above usage preference information comprising a first preference score information with a highest score corresponding to various types of first usage information, may be represented as: a combination of pieces of usage preference information comprising a first preference score information with a highest score corresponding to various types of first usage information. For example, there may be two types of first usage information: operator information and base station service information (band information); the operator information may include: China Telecom and China Mobile, wherein, the score of the first preference score information for China Telecom is 5, and the score of the first preference score information for China Mobile is 4. The band information may include: high frequency and low frequency, wherein, the score of the first preference score information for high frequency is 5, and the score of the first preference score information for low frequency is 4. Then the above combination will be the first preference score information for China Telecom with a score of 5, and the first preference score information for high frequency with a score of 5.

It should be noted, in order to be able to share a result of optimized communication performance with other terminals located in a same network, according to an embodiment of the present disclosure, after the step of S204, the above method may further include: uploading the above result of adjusted communication performance and/or the control information determined based on the above use preference information to a shared platform of the above network.

According to an embodiment of the present disclosure, after the step of S202, the above method may further include: in response to a second terminal in a same network with the first terminal accomplishing communication performance adjustment of the second terminal based on a first control information, the first usage information of the first terminal being consistent with the first usage information of the second terminal, and the usage preference information of the first terminal being consistent with the usage preference information of the second terminal, adjusting the communication performance of the first terminal using the first control information. Thus, sharing the information of other terminals through the network can improve the optimization speed of the communication performance of other terminals.

Optionally, the executive body of the above steps may be the above first terminal, such as, but not limited to, the terminal shown in FIG. 1, etc.

Through the description of the foregoing embodiments, it is clear to those skilled in the art that the method according to the foregoing embodiments may be implemented by software and a necessary general hardware platform. Certainly, it may also be implemented by hardware, but in many cases the former is better. Based on such an understanding, the technical scheme of the present disclosure can be embodied in the form of a software product in essence, or in parts contributed to related technologies. The computer software product is stored in a non-transitory computer readable storage medium (such as ROM/RAM, magnetic disk, optical disk), and includes several instructions to enable a first terminal device (which may be a mobile phone, computer, server, or network device, etc.) to execute the method described in each embodiments of this disclosure.

In this embodiment, a performance adjustment apparatus is provided, wherein the apparatus is used to implement the above embodiment(s) and advantageous implementation(s). Details are not described again herein. As used below, the term "module" may be a combination of software and/or hardware that implements a predetermined function. Although the apparatuses described in the following embodiment(s) are preferably implemented in software, implementation of hardware or a combination of software and hardware is also possible and contemplated.

Figure 3:
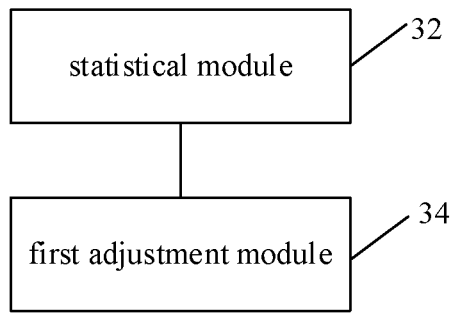
FIG. 3 is a structural diagram of a performance adjustment apparatus according to an embodiment of the present disclosure.

FIG. 3 is a structural diagram of a performance adjustment apparatus according to an embodiment of the present disclosure, as shown in FIG. 3, the apparatus includes:

a statistical module 32, configured to perform statistics on first usage information of a first terminal, to obtain usage preference information corresponding to the first usage information;

a first adjustment module 34, connected to the statistical module 32 and configured to adjust communication performance of the first terminal based on the usage preference information.

Through the above apparatus, the first usage information of the terminal is obtained by performing statistics on the first use information of the terminal. The communication performance of the terminal is adjusted based on the use preference information. By continuously performing statistics on the first use information of the terminal, the communication performance of the terminal can be continuously adjusted based on the obtained use preference information. As a result, the terminal can continuously learn and optimize, wherein the communication performance of the terminal can be continuously adjusted and optimized based on the acquired use preference information. Therefore, as a problem of the related technology, deterioration of communication performance caused by a fixed and dedicated design of the terminal, can be solved, and thus the communication performance can be improved and the user communication experience can be enhanced.

It should be noted that the above first usage information may include at least one of the following: operator information used by the first terminal, communication address information of the first terminal, service information used by the first terminal, the usage gesture information of the first terminal, base station service information used by the first terminal.

It should be noted that the above operator information may be China Mobile, China Unicom, China Telecom, etc., but it is not limited to these. The above communication address information may be information of countries such as China, the United States, and Europe, and is not limited to these. The above communication address may be also the building, the street, the province, the town, the city where the first terminal is located, and a specific location of the room in the building, but it is not limited to these. The above service information may include, but is not limited to, data service and voice service. The usage gesture information may be a placement manner of the first terminal, or a gesture in which a user holds the first terminal, for example, the user holds the first terminal only with a right hand, or only with a left hand, but it is not limited to these. The base station service information may include, but is not limited to: frequency band information corresponding to the service information, information of a base station serving the above first terminal, cell frequency point(s) in the frequency band corresponding to the base station, power feedback or bit error rate feedback information of the base station.

It should be noted that the above usage preference information may include: first preference score information corresponding to the first usage information, wherein the first preference score information is used to indicate the number of times the first usage information is used. The higher score of the first preference score information has, the greater number of times the first usage information is used, corresponding to the score.

According to some embodiments, the score of the first preference score information is positively related to the number of times the first usage information is used; for example, the score of the first preference score information is proportional to a usage frequency of the first usage information; however, it's not limited to a proportional relationship.

In the following description, taking the first usage information being the operator information as an example, the operator information may include China Unicom, China Mobile, and China Telecom. It's assumed that China Unicom is used more times than the others, China Mobile is used less times, and China Telecom is used least times. Therefore, a user of the above first terminal prefers to use China Unicom, followed by China mobile, and at last China Telecom. Thus, the score of the first preference score information for China Unicom is highest, followed by China Mobile, and at last China Telecom.

According to an embodiment of the present disclosure, the first adjustment module 34 may include: a determination unit, configured to determine control information based on the usage preference information; an adjustment unit, connected to the above determination unit and configured to adjust the communication performance of the first terminal based on the determined control information.

It should be noted, the above adjustment unit may be also configured to adjust an antenna standing wave of the first terminal and/or selecting an antenna in use for the first terminal, based on the control information.

According to an embodiment of the present disclosure, the above apparatus may further include: an acquisition module, configured to obtain second usage information of the first terminal; an output module, connected to the above acquisition module and configured to output the control information in response to the second usage information being consistent with the first usage information; a second adjustment module, connected to the above output module and configured to adjust the communication performance of the first terminal based on the control information.

It should be noted, the above apparatus further includes: an update module, connected to the above acquisition module and configured to, in response to the second usage information being inconsistent with the first usage information, add the second usage information into the first usage information, and assign a second preference score information to the second usage information.

According to an embodiment of the present disclosure, the above determination unit is also configured to determine the control information, in response to the first terminal being not using communication service, based on a current locating information of the first terminal, and/or based on an usage preference information comprising a first preference score information with a highest score corresponding to various types of first usage information, wherein, the usage preference information in which a first preference score information with a highest score corresponding to various types of first usage information, is in conformity with the locating information; and/or determine the control information, in response to the first terminal being using communication service, based on an usage preference information comprising a first preference score information with a highest score corresponding to various types of first usage information.

According to an embodiment of the present disclosure, the above apparatus further includes: a second adjustment module, connected to the above statistical module 32 and configured to, in response to a second terminal in a same network with the first terminal accomplishing communication performance adjustment of the second terminal based on a first control information, the first usage information of the first terminal being consistent with the first usage information of the second terminal, and the usage preference information of the first terminal being consistent with the usage preference information of the second terminal, adjust the communication performance of the first terminal using the first control information.

It should be noted, the above apparatus may be disposed in the above first terminal, such as, but not limited to, the terminal shown in FIG. 1.

It should be noted that the above modules may be implemented by software or hardware. For the latter, it may be implemented by the following, but not limited to: the modules are all located in a same processor; alternatively, the modules are located in different processors in any combination.

An embodiment of the present disclosure further provides a terminal including the above apparatus. Details of the apparatus are not described herein again.

An embodiment of the present disclosure further provides a non-transitory computer-readable storage medium having a computer program stored therein, wherein the computer program is configured to perform the steps in any of the methods described above when executed.

Optionally, in this embodiment, the above non-transitory computer-readable storage medium may include various media capable of storing computer programs, such as, but not limited to, USB flash disk, Read-Only Memory (ROM), Random Access Memory (RAM), mobile hard disk, magnetic disk, or compact disk.

The embodiments of the present disclosure further provide an electronic device including a memory in which a computer program is stored and a processor configured to execute the computer program to perform the steps in any of the methods described above.

Optionally, the above electronic device may further include a transmission device and an I/O device, wherein both of the transmission device and the I/O device are connected to the processor.

Optionally, for a specific example in this embodiment, reference may be made to the example(s) described in the above embodiment(s) and optional implementation(s). This embodiment is not described herein again.

For a better understanding of the present disclosure, it is further explained below in conjunction with advantageous embodiment(s).

According to the embodiments of the present disclosure, there are provided a method and an equipment for optimizing communication performance based on intelligent learning. With respect to a problem of communication performance being affected by different severe environments for different terminals, a scheme is proposed to maximize the communication performance and enhance a user's communication experience. The following description is provided by taking a mobile phone as an example for the terminal:

The circuitries in existing mobile phone terminals are becoming more and more complex. A mobile phone is usually compatible with the frequency bands of various operators around the world. A mobile phone usually has dozens of different frequency bands and communication channels of different standards, however, an existing mobile phone antenna is unlikely to maintain good transmission and reception efficiency for all frequency bands. Conventionally, a ground feed switching or an adjustable matching of a main feed is utilized to offset a best efficiency point for a mobile phone's frequency band. However, the existing control method is relatively simple, and the changes in the ground feed matching and the main feed matching are only simply determined by a working frequency band. As to which standard is working in this frequency band, whether it is data service or voice service, which channel is working in this frequency band, etc., these kinds of information are not involved in a tuner control. In addition, network usages are personalized among individual users, thus it's impossible to preset a mobile phone from the factory to match so many networks, standards, and habits of usages. Therefore, the present disclosure adopts a gradual learning mode to collect individual users' information related to network use, and matches the mobile phone antenna to the user's personalized requirements to achieve the best antenna status for this user.

For example: a user usually uses China Unicom network LTE Band41 to access the Internet. The frequency band allocated by China Unicom in China is 2555 to 2575 MHz. Therefore, after learning the user information, the antenna matching is changed, and the best point of matching is placed at the frequency of 2555 to 2575 MHz, without even considering whether it's optimum in the entire band41, so that the narrow band effect of the antenna can be used to obtain better matching and debugging. The related technology, however, must consider the full frequency band B41 for a balanced performance, the overall performance is at an average level or even poor.

According to the method of the embodiment of the present disclosure, the antenna state information of a single terminal can be shared through the network, and multi-user analysis can be performed in the cloud. Based on the multi-user data, the antenna state of the mobile phone can be analyzed to share the best antenna state preset for a current user unknown territory.

Figure 4:
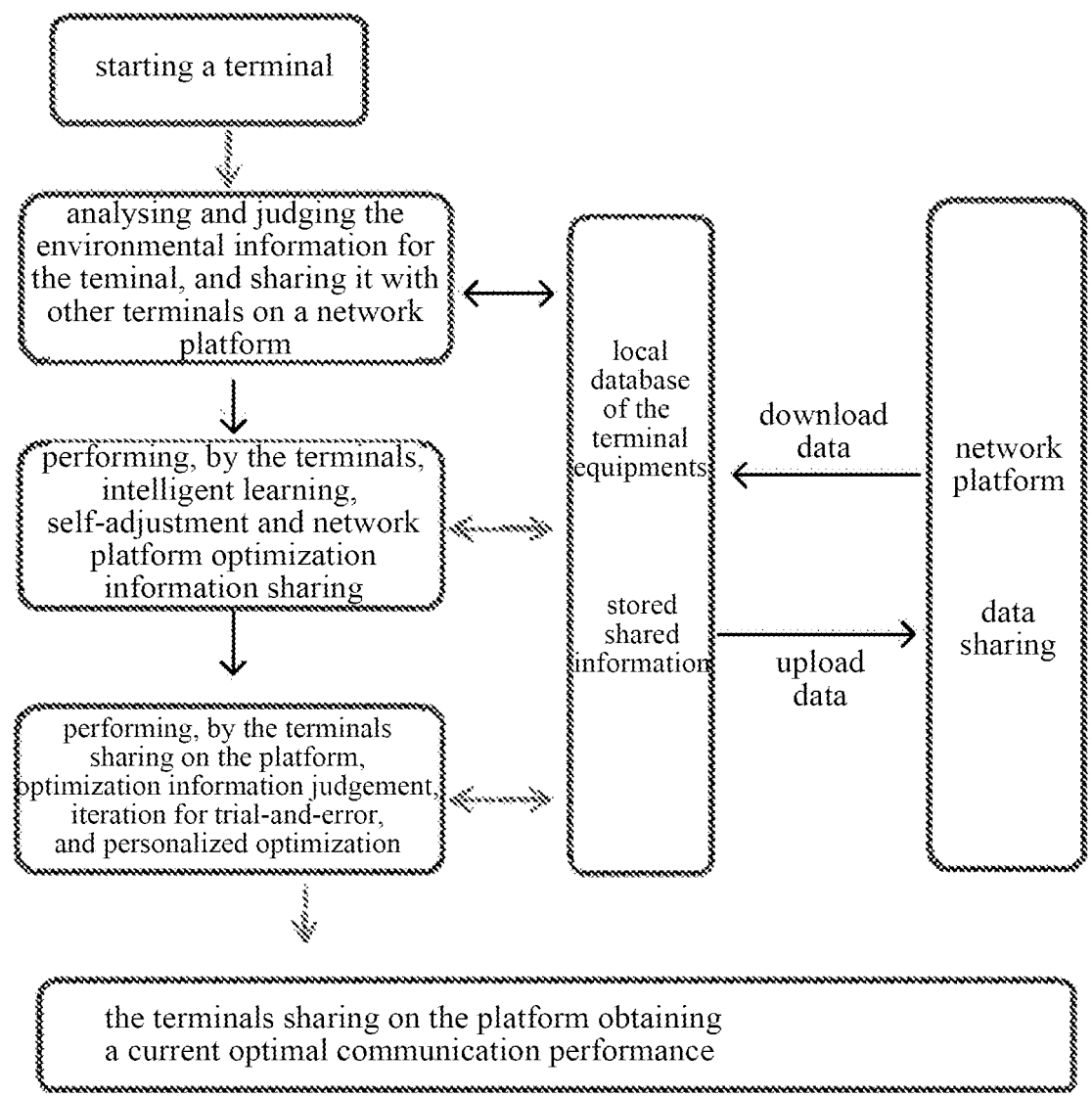
FIG. 4 is a flowchart of a method according to an embodiment of the present disclosure.

Further, in the embodiments of the present disclosure, "network sharing" is used to record the user's antenna status of the mobile phone in different usage scenarios. FIG. 4 is a flowchart of a method according to an embodiment of the present disclosure, as shown in FIG. 4, the method includes: at step 1, analyzing and judging environmental information for a terminal, and sharing with other terminals on a network platform; at step 2, performing, by the terminal equipment, intelligent learning, self-adjustment and network platform optimization information sharing; at step 3, performing, by the terminals sharing on the platform, optimization information judgement, iteration for trial-and-error, and personalized optimization; at step 4, the terminals sharing on the platform obtaining a current optimum communication performance, for real time communication in an actual complex environment. Finally, user experience on optimum communication quality can be achieved.

It should be noted that the above steps 1 and 2 may correspond to the above steps S202 and S204, and the above step 4 may correspond to the step in the above embodiments: in response to a second terminal in a same network with the first terminal accomplishing communication performance adjustment of the second terminal based on a first control information, the first usage information of the first terminal being consistent with the first usage information of the second terminal, and the usage preference information of the first terminal being consistent with the usage preference information of the second terminal, adjusting the communication performance of the first terminal using the first control information.

Here, a method and equipment for optimizing communication performance based on intelligent learning is exemplified, and the personalized requirements for network usage preferences are taken as an example to illustrate the implementation of the method of the present disclosure.

Assume that a certain terminal supports all mobile network standards (that is, it supports multiple operators' communication services at the same time). Further, the terminal supports complex communications from multiple operators, such as covering multi-mode and multi-frequency, various forms of combination CA, and differentiated demands with respect to various operators.

However, for the related technology, the above scenario can only be achieved, by either compromising appearance and material, or compromising communication quality while satisfying the above requirements.

I. Assume that a certain terminal supports all mobile network standards in China, it need to satisfy all requirements from the three major operators in China. The terminal adopts the method of the present disclosure. First, the terminal performs environmental information analysis and judgment to obtain the following usage preference information (which may be equivalent to the usage preference information in the above embodiment):

1. A user's usage preference of the terminal is: China Mobile LTE data service as a first priority; China Telecom LTE data service as a second priority; there is hardly a demand for China Telecom LTE data service.

2. For a user of the terminal, the situation of supporting base stations in a frequently-used area is: China Mobile network has a preferable network environment under B40; China Unicom network has a preferable network environment under B3.

Figure 5:
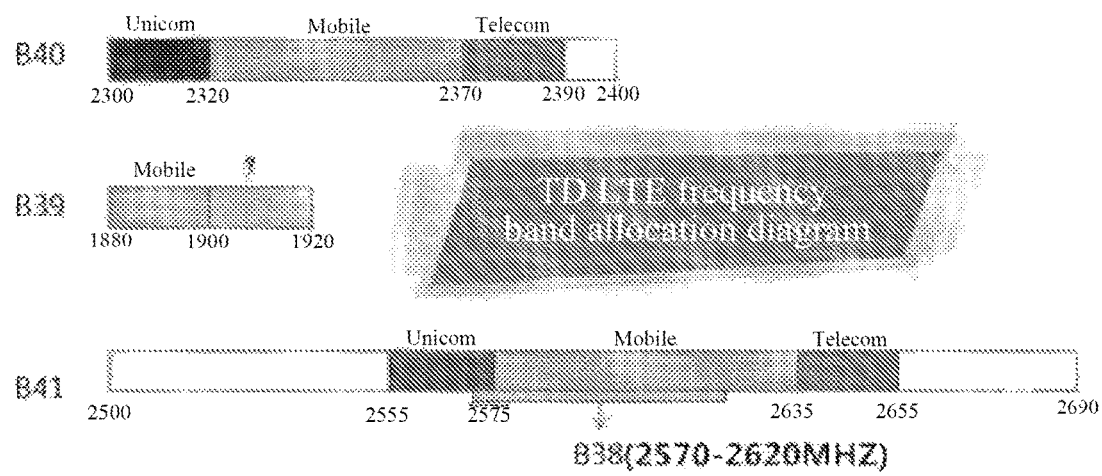
FIG. 5 is a schematic diagram of a TD LTE frequency band used by China Mobile according to an embodiment of the present disclosure.
Figure 6:
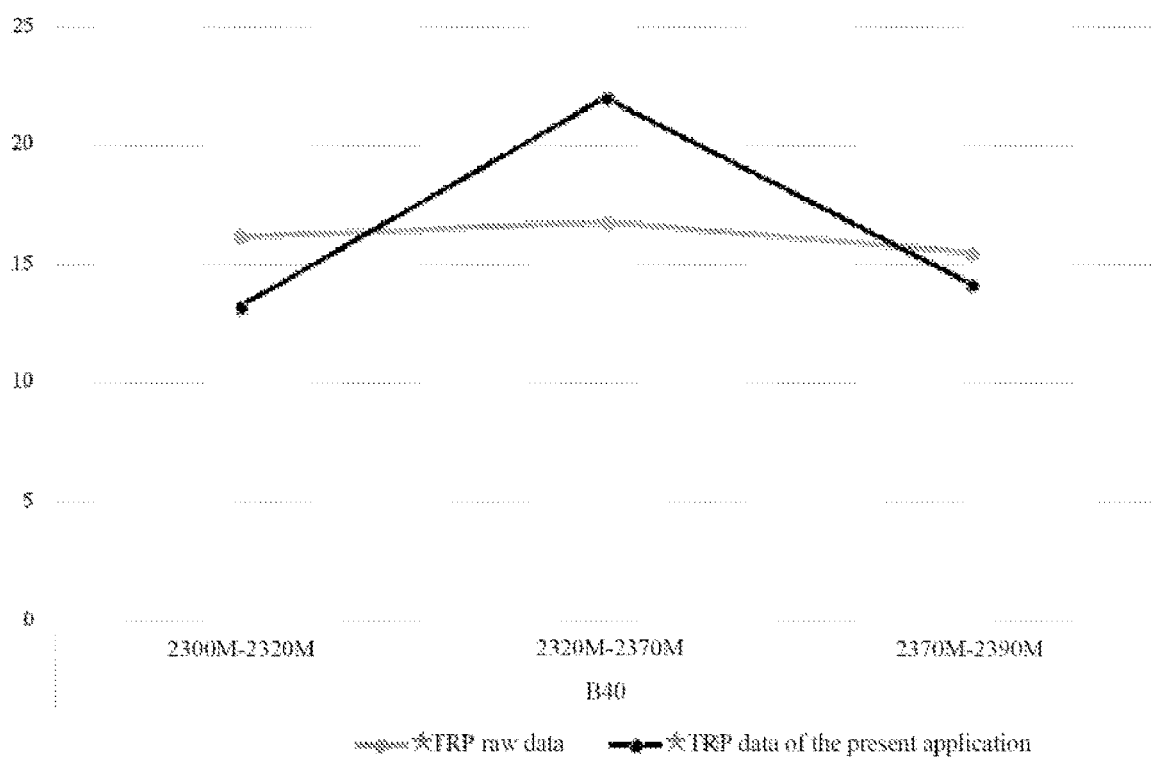
FIG. 6 is a schematic diagram of an improvement on an intermediate frequency band B40 for China Mobile according to an embodiment of the present disclosure.

FIG. 5 is a schematic diagram of a China Mobile TD LTE frequency band according to an embodiment of the present disclosure. As shown in FIG. 5, for the user of the above terminal using China Mobile, only B40 intermediate frequency band 2320 M to 2370 M is used. According to the method of the embodiment of the present disclosure, the intermediate frequency band 2320 M to 2370 M can be enhanced, as shown in FIG. 6. FIG. 6 is a schematic diagram of an improvement on an intermediate frequency band B40 for China Mobile according to an embodiment of the present disclosure.

Figure 7:
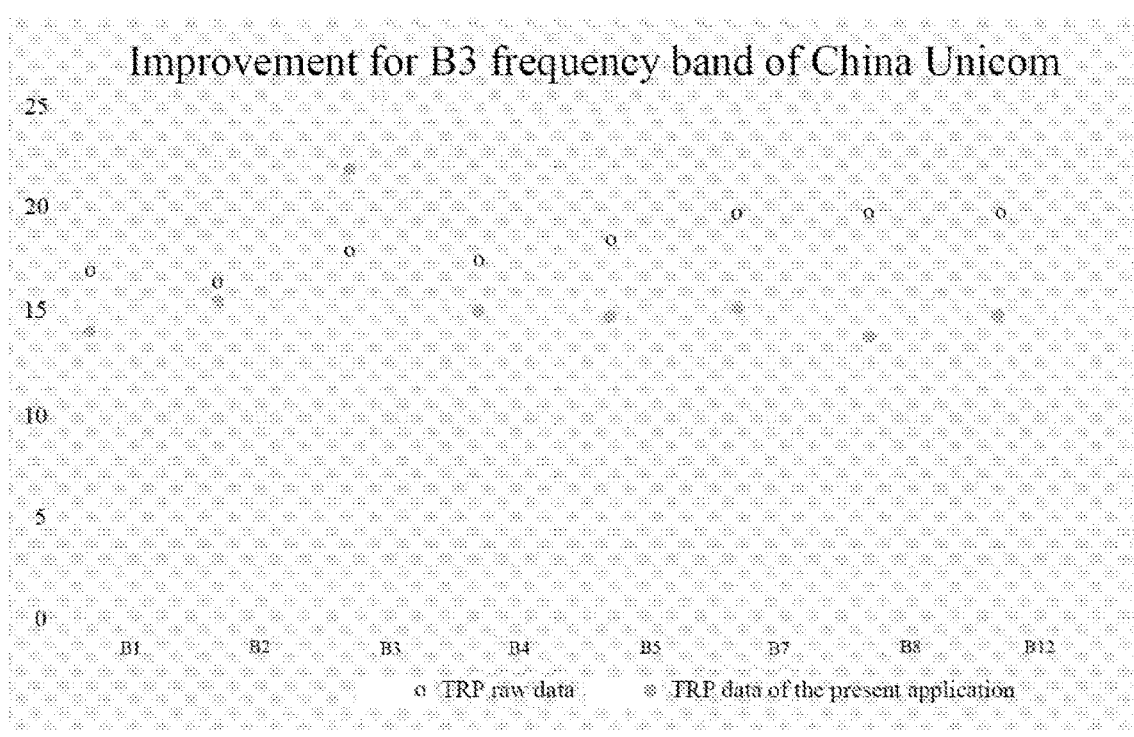
FIG. 7 is a schematic diagram of an improvement only on B3 for China Unicom according to an embodiment of the present disclosure.
Figure 8:
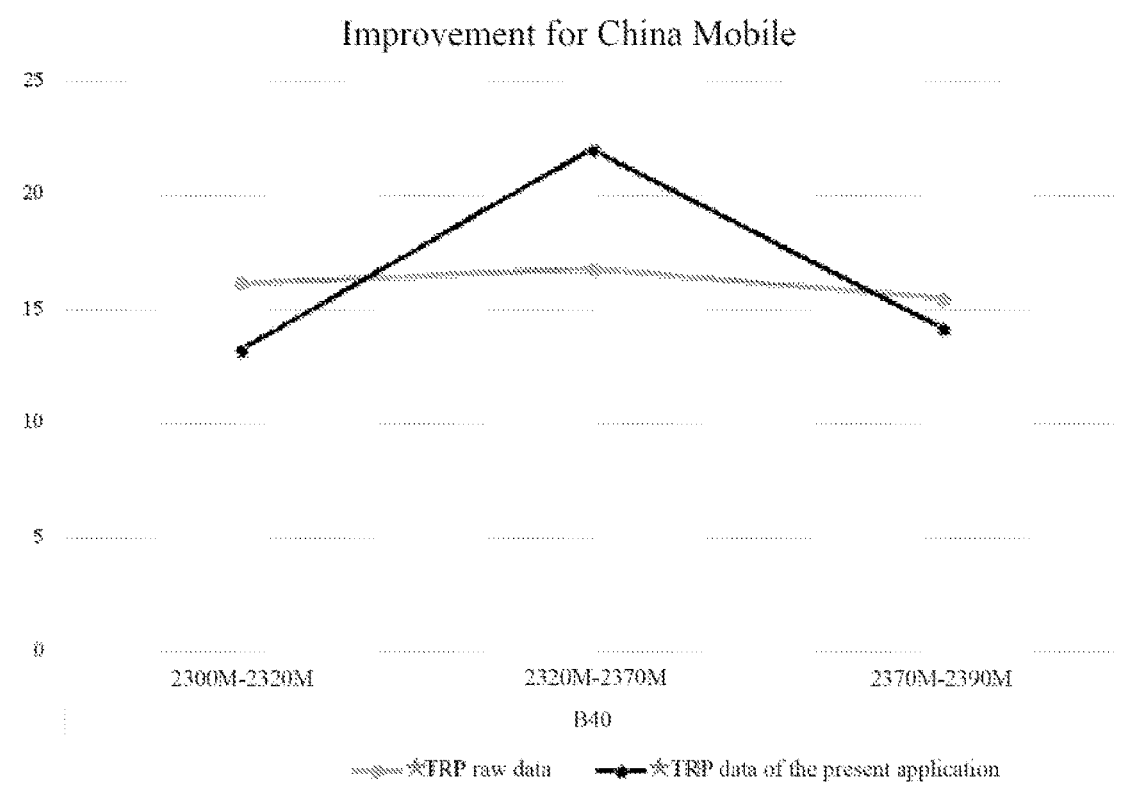
FIG. 8 is a schematic diagram of an improvement only on high frequency band B3 for China Unicom in some scenarios according to an embodiment of the present disclosure.

Similarly, as shown in FIG. 7, FIG. 7 is a schematic diagram of an improvement only on B3 for China Unicom according to an embodiment of the present disclosure. The user of the terminal only uses China Unicom B3 at this time, regardless of others. According to the method of the embodiment of the present disclosure, only B3 is improved. Further, the user of the terminal at certain moments in certain areas only uses China Unicom B3 high frequency band, it can only improve the high frequency band, regardless of B3 low and intermediate frequency bands. As shown in FIG. 8, FIG. 8 is a schematic diagram of an improvement only on high frequency band B3 for China Unicom in some scenarios according to an embodiment of the present disclosure.

According to some embodiments, an example is described, as how to implement specific information collection, specific learning of judgment:

In a first step, performing specific information collection:
(1) The terminal collects the user's usage habits, including usage preferences on operators, terminal communication location preferences, usage details preferences such as data service and voice service.
(2) The terminal collects network information, including base station information and operator network status.
(3) As shown in FIG. 4, the terminal shares all information (including uploading and downloading) on the network platform, here is mainly to download the information feedback from other terminals, such as: the information of other terminals currently on the same network, similar locations, and similar usage preferences.

It should be noted that the collection of user's usage habits and network information may be equivalent to the step of S202 in which performing statistics on the first usage information to obtain usage preference information corresponding to the first usage information.

In a second step, performing specific learning of judgment:
(1) Performing learning of judgment by collecting the user's usage habits to the terminal, for example, the preference on operator is China Mobile LTE and China Unicom LTE; the base station for terminal communication and operator network state are China Mobile B40 and China Unicom B3; the user has a heavy usage to data service.
(2) Based on the scenarios indicated by most of the above usage habits, considering an usage scenario in which the user is currently using the terminal, if the usage scenario is in conformity with the scenarios indicated by the above usage habits, providing a judgment conclusion and control information, i.e.: at this moment, the terminal only focus on RF (radio frequency) performance of China Mobile B40 and China Unicom B3, other RF performance can be compromised.
(3) The shared information from other terminals on the network platform, are used as reference for providing judgment conclusion and control information.
(4) If the comparison result in (2) is that the usage scenario is not in conformity with the scenarios indicated by the above usage habits, collecting first usage information of the current user, operator base station information, shared information from other terminals on the network platform, to prepare a second scenario (i.e. a scenario additionally indicated by above first usage information, operator base station information), (equivalent to a step in the above embodiment: in response to the second usage information being inconsistent with the first usage information, adding the second usage information into the first usage information, and assigning a second preference score information to the second usage information), repeating steps from (1), (2), (3).

It should be noted, the user first usage information and operator base station information in this embodiment are equivalent to the first usage information in the above embodiments.

II. Continue to follow the assumption of this embodiment, the terminal adopts the scheme according to the embodiment of the present disclosure, followed by individual intelligent learning, self-control adjustment, and network platform optimization information sharing.

Figure 9:
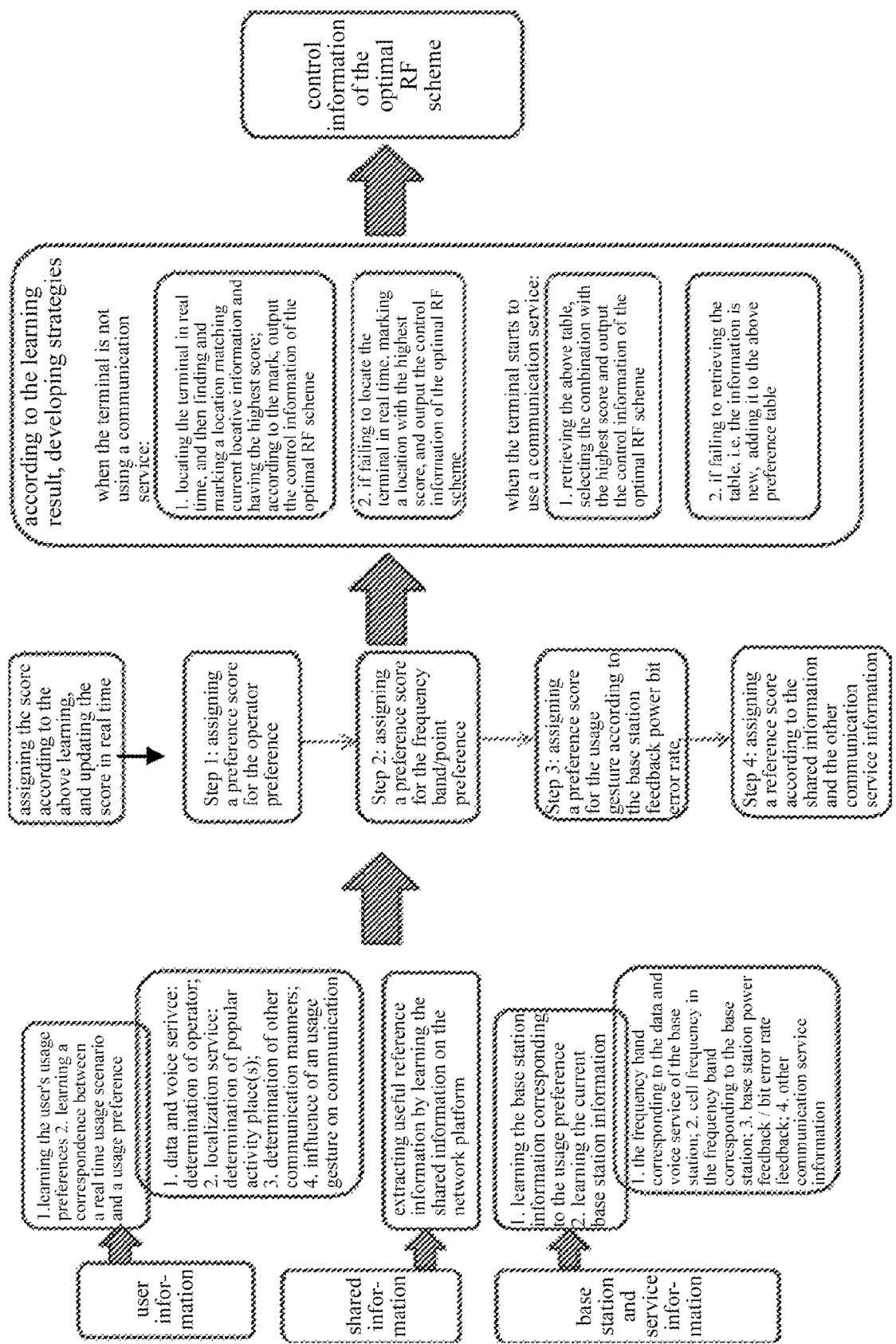
FIG. 9 is a schematic diagram of a scheme of intelligent learning algorithm for a single unit according to an embodiment of the present disclosure.

FIG. 9 is a schematic diagram of a scheme of intelligent learning algorithm for a single unit according to an embodiment of the present disclosure. As shown in FIG. 9, the input of the single unit intelligent algorithm are "user information", "shared information", "base station and service information", and the output of the single unit intelligent algorithm is "control information of the optimum RF scheme", which provides the optimum radio frequency scheme.

1. Three kinds of input information: "user information", "shared information", "base station and service information".

It should be noted, "user information", "shared information", "base station and service information" are equivalent to the first usage information in the above embodiments.

2. With respect to the user information, learning the user's usage preferences, and learning a correspondence between a real time usage scenario and a usage preference.

As categorized: data service, voice service, selection of operator; localization service, selection of popular activity place(s); determination of other communication manners, such as whether NFC is commonly used; selection for an extent of influence of an usage gesture on communication.

For example, it could be "the user prefers data service", "usually uses China Mobile B40 and China Unicom B3", "usually holds the terminal with the right hand", "the user does not use NFC".

With respect to base station and service information, learning base station information corresponding to the user's usage preferences, and learning real time base station information.

As categorized: the frequency band corresponding to the data and voice service of the base station; cell frequency in the frequency band corresponding to the base station; base station power feedback/bit error rate feedback; other communication service information as reference:

For example, it could be "usually staying at No. * China Mobile base station in Nanshan District, Shenzhen, usually staying at No. * China Unicom base station in Nanshan District, Shenzhen", "for a hotspot where the user usually locates, the base station power feedback being in a certain range", "for a hotspot where the user usually locates, the base station bit error rate feedback being in a certain range".

3. Based on the forgoing learning, assigning a usage score, and updating in real time (equivalent to obtaining usage preference information).

In a first step, assigning a preference score for operator selection;

As shown in table 1, learning and assigning scores in the terminal, and updating in real time. For example, China Mobile is selected more times and even more over time, so the preference score is updated in real time, the more times, the higher the preference score (calculation details are not described here), wherein flag bits i.e. index addresses are provided for searching.

TABLE 1

| Preference score | Operator | Flag bit (index add.) |
| --- | --- | --- |
| 5 | China Mobile | 0**************1 |
| 4 | China Unicorn | 0**************2 |
| 1 | China Telecom | 0**************3 |
| 0.5 | North America AT&T | 0**************4 |
| 0.3 | North America VSW | 0**************5 |

In a second step, under each supported operator, assigning a frequency band/frequency point usage preference score;

As shown in table 2, learning and assigning scores in the terminal, and updating in real time. For example, China Mobile B40 intermediate frequency band is selected more times and even more over time, so the preference score is updated in real time, the more times, the higher the preference score, wherein flag bits i.e. index addresses are provided for searching.

TABLE 2

| Preference score | Frequency band/point | Flag bit (index add.) |
| --- | --- | --- |
| 0.1 | B40 low | 1**************1 |
| 5 | B40 intermediate | 1**************2 |
| 0.2 | B40 high | 1**************3 |
| 0.5 | B3 low | 1**************4 |
| 0.3 | B3 intermediate | 1**************5 |
| 4 | B3 high | 1**************6 |

In a third step, under a frequency band/frequency point of each supported operator, considering base station feedback power and error rate, assigning a preference score for an user gesture.

As shown in table 3, learning and assigning scores in the terminal, and updating in real time. For example, a usage gesture of single and right-hand holding is used more times and even more over time, so the preference score is updated in real time, the more times, the higher the preference score, wherein flag bits i.e. index addresses are provided for searching.

TABLE 3

| Preference score | Usage gesture | Flag bit (index add.) |
| --- | --- | --- |
| 5 | single and right hand | 2**************1 |
| 0.4 | single and left hand | 2**************2 |
| 4 | head and right hand | 2**************3 |
| 0.5 | head and left hand | 2**************4 |
| 3 | placed horizontally in free space | 2**************5 |

In a fourth step, assigning a reference score for shared information and other communication service information.

4. Based on the learning results, setting a strategy (equivalent to a step in the above embodiment: determining the control information, in response to the first terminal being not using communication service, based on a current locating information of the first terminal, and based on an usage preference information comprising a first preference score information with a highest score corresponding to various types of first usage information, wherein, the usage preference information in which a first preference score information with a highest score corresponding to various types of first usage information, is in conformity with the locating information; and/or determining the control information, in response to the first terminal being using communication service, based on an usage preference information comprising a first preference score information with a highest score corresponding to various types of first usage information).

In response to the terminal being not using communication service:

Performing real-time localization, retrieving an index of usage preference information being in conformity with the current locating information and having the highest score, making a flag, i.e. recording the index address. Based on the flagging status, outputting control information for an optimum RF scheme.

In response to a failure of real time localization, directly retrieving an index of usage preference information having the highest score, outputting control information for an optimum RF scheme.

In response to the terminal starting to use communication service:

retrieving an index of a combination of usage preference information having the highest score, outputting control information for an optimum RF scheme.

In response to a failure of retrieving an index, i.e. a state of new information, adding this new information to the forgoing list of preferences.

5. Outputting control information for an optimum RF scheme continuously in real time.

Updating control information for an optimum RF scheme continuously in real time, performing self-control adjustment, and implementing the optimum RF scheme.

At this time, it is assumed that "user prefers data services", "usually uses China Mobile B40 and China Unicom B3", "usually uses right-handed gestures", "users do not use the NFC function", "usually staying at No. * China Mobile base station in Nanshan District, Shenzhen, usually staying at No. * China Unicom base station in Nanshan District, Shenzhen", "for a hotspot where the user usually locates, the base station power feedback being in a certain range", "for a hotspot where the user usually locates, the base station bit error rate feedback being in a certain range", "a terminal holding gesture by single and right hand", then the above learning algorithm can provide a set of control information for the optimum RF scheme.

For China Mobile B40 intermediate frequency band and China Unicom B3, performing a specific RF performance improvement, while RF performance of other frequency bands can be compromised.

According to some embodiments, adjustable measures may be adopted, examples are as follows:

Example a: Scheme of intelligent tunable standing wave adjustment. I.e., with respect to China Mobile B40 intermediate frequency band and China Unicom B3 high frequency band, a single and right-hand holding gesture, the communication performance can be ensured to be optimum via the intelligent tunable scheme by adjusting the standing wave.

Figure 10:
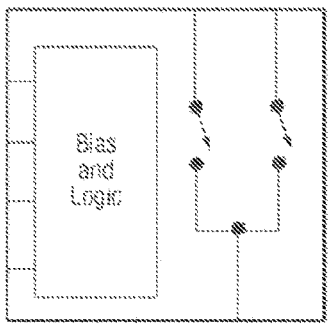
FIG. 10 is a schematic diagram of a scheme of an intelligent tunable adjustment of standing wave according to an embodiment of the present disclosure.
Figure 10:
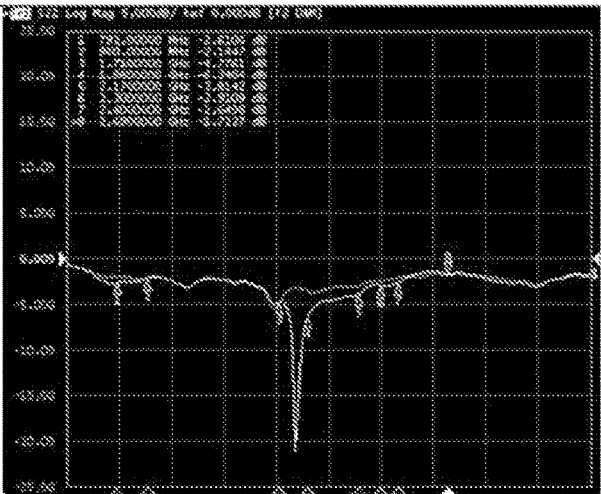
Figure 10:
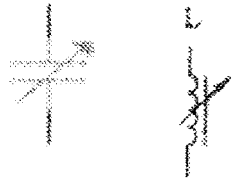
Figure 10:
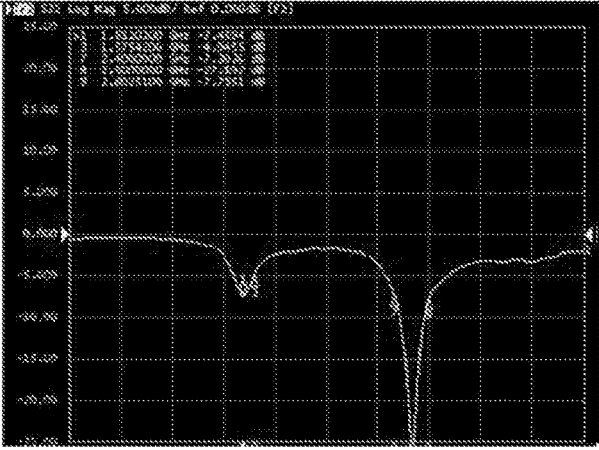

FIG. 10 is a schematic diagram of a scheme of intelligent tunable standing wave adjustment according to an embodiment of the present disclosure. As shown in FIG. 10, with respect to China Mobile B40 intermediate frequency band, and a right-hand holding gesture, a switching scheme can be adopted, in which an antenna standing wave is adjusted by switching on and off, to ensure an optimum performance.

As shown in FIG. 10, with respect to China Unicom B3 high frequency band, a right-hand holding gesture, the communication performance can be ensured to be optimum via a capacitive/inductive intelligent adjustable scheme for antenna standing wave adjustment.

Example b: a scheme of switching antennas. I.e., with respect to China Mobile B40 intermediate frequency band and China Unicom B3 high frequency band, a single and right-hand holding gesture, selecting an optimum antenna or an optimum antenna region.

FIG. 11 is a schematic diagram of a scheme of antenna switching according to an embodiment of the present disclosure. As shown in FIG. 11, with respect to China Mobile B40 intermediate frequency band, and right-hand holding gesture, a scheme of feed points switching combination can be adopted, in which a better antenna region with optimum performance can be selected by switching on and off.

As shown in FIG. 11, with respect to China Unicom B3 high frequency band, a right-hand holding gesture, a scheme of feed point switching can be adopted, in which another antenna with optimum performance can be selected by switching on and off.

Finally, with respect to China Mobile B40 intermediate frequency band and China Unicom B3 high frequency band, a single and right-hand holding gesture, optimum RF performance can be achieved. Moreover, the above resulting information can be uploaded to the network platform for optimization information sharing.

III. The other terminals sharing on the platform can judge the optimization information, perform iteration for trial-and-error, and perform personalized optimization;

As described above, when a terminal complete communication performance optimization once, the other terminals on the shared platform synchronize all optimization information. For example, the above control manner dedicated for China Mobile B40 intermediate frequency band, China Unicom B3 high frequency band and a single and right-hand holding gesture, as shown in FIG. 10 and FIG. 11.

As assumed: a certain terminal on the network platform also adopts the technology of the present disclosure, which is in conformity with the environmental information and usage preferences of the first terminal that has completed the optimization of communication performance. Then the control information of the first terminal can be used directly to directly change the radio frequency control scheme to improve performance.

As assumed: a certain terminal on the network platform also adopts the technology of the present disclosure, some scenarios in which the terminal is used are similar to the status (for example usage preferences) of the first terminal that has completed the optimization of communication performance. Then the control information of the first terminal can be used directly to directly change the radio frequency control scheme; a judgment whether there is improvement is made based on an actual result, if there is no improvement, that is, an error; then again, another terminal with similar information is selected for direct change and judgment; this process is repeated until the performance is indeed optimized.

As assumed: a certain terminal on the network platform also adopts the technology of the present disclosure, the performance improvement is performed on the terminal by following all processes on the first terminal, and information is shared.

In summary, there may be various of information usage schemes for numerous terminals shared on the network platform. The performance of the current terminal can be finally improved by using the scheme according to the present disclosure.

IV. The other terminals sharing on the platform can obtain a current optimum communication performance. For real time communication in an actual complex environment, optimum communication performance can be achieved for all of them.

It will be apparent to those skilled in the art that the modules or steps of the present disclosure described above may be implemented by a general-purpose computing device. They may be centralized on a single computing device or distributed across a network of computing devices. Alternatively, they may be implemented by program code executable by a computing device, such that they may be stored in a memory device and executed by a computing device. In some cases, the steps shown or described may be executed out of order shown in the present disclosure, or separately as integrated circuit modules, or multiple modules or steps thereof may be implemented as a single integrated circuit module. Thus, the present disclosure is not limited to any specific combination of hardware and software.

The foregoing description merely portrays some illustrative embodiments according to the present disclosure and therefore is not intended to limit the present disclosure. The present disclosure is intended to cover various modifications and variations thereof for those skilled in the art. Any modification, equivalent replacement, improvement and the like made within the principle of the present disclosure shall be included in the protection scope of the present disclosure.

The invention claimed is:

1. A method for performance adjustment, comprising:
   performing statistics on first usage information of a first terminal, to obtain usage preference information corresponding to the first usage information;
   determining control information based on the usage preference information;
   adjusting the communication performance of the first terminal based on the determined control information;
   obtaining a second usage information of the first terminal;
   outputting the control information in response to the second usage information being consistent with the first usage information; and
   adjusting the communication performance of the first terminal based on the control information.

2. The method of claim 1, wherein the first usage information comprises at least one of following: operator information used by the first terminal, communication address information of the first terminal, service information used by the first terminal, the usage gesture information of the first terminal, base station service information used by the first terminal.

3. The method of claim 1, wherein the usage preference information comprises: first preference score information corresponding to the first usage information, wherein the first preference score information indicates the number of times the first usage information is used; the higher score of the first preference score information, the greater number of times the first usage information is used, corresponding to the score.

4. The method of claim 1, wherein, after obtaining a second usage information of the first terminal, the method further comprises:
   adding the second usage information into the first usage information, and assigning a second preference score information to the second usage information, in response to the second usage information being inconsistent with the first usage information, wherein the second preference score information indicates a number of times the second usage information is used; the higher score of the second preference score information, the greater number of times the second usage information is used, corresponding to the score.

5. The method of claim 1, wherein determining control information based on the usage preference information comprises:
   determining the control information, in response to the first terminal being not using communication service, based on a current locating information of the first terminal, and/or based on usage preference information comprising a first preference score information with a highest score corresponding to various types of first usage information; and/or,
   determining the control information, in response to the first terminal being using communication service, based on usage preference information comprising a first preference score information with a highest score corresponding to various types of first usage information.

6. The method of claim 1, wherein adjusting the communication performance of the first terminal based on the control information comprises:
   adjusting an antenna standing wave of the first terminal and/or selecting an antenna for the first terminal based on the control information.

7. The method of claim 1, wherein, after performing statistics on first usage information of a first terminal to obtain usage preference information corresponding to the first usage information, the method further comprises:
   in response to a second terminal in a same network with the first terminal accomplishing communication performance adjustment of the second terminal based on a first control information, the first usage information of the first terminal being consistent with the first usage information of the second terminal, and the usage preference information of the first terminal being consistent with the usage preference information of the second terminal, adjusting the communication performance of the first terminal using the first control information.

8. An apparatus for performance adjustment, comprising:
   a statistical module, configured to perform statistics on first usage information of a first terminal, to obtain usage preference information corresponding to the first usage information;
   a first adjustment module, configured to adjust communication performance of the first terminal based on the usage preference information; a determination unit, configured to determine control information based on the usage preference information;
   an adjustment unit, configured to adjust the communication performance of the first terminal based on the determined control information;
   an acquisition module, configured to obtain second usage information of the first terminal;
   an output module, configured to output the control information in response to the second usage information being consistent with the first usage information; and
   a second adjustment module, configured to adjust the communication performance of the first terminal based on the control information.

9. An electronic device comprising a non-transitory computer readable storage medium having a computer program stored therein, and a processor arranged to execute the computer program to perform a method for performance adjustment, wherein the method comprises:
   performing statistics on first usage information of a first terminal, to obtain usage preference information corresponding to the first usage information;
   determining control information based on the usage preference information;
   adjusting the communication performance of the first terminal based on the determined control information;
   obtaining a second usage information of the first terminal;
   outputting the control information in response to the second usage information being consistent with the first usage information; and
   adjusting the communication performance of the first terminal based on the control information.

* * * * *